(12) United States Patent
Kumaran et al.

(10) Patent No.: US 10,951,490 B2
(45) Date of Patent: Mar. 16, 2021

(54) INTELLIGENT TUNNEL ASSIGNMENT AND DYNAMIC SLA THRESHOLD CONFIGURATION TO INCREASE AVAILABILITY AND UTILIZATION OF SD-WAN TUNNELS

(71) Applicant: Cisco Technology, Inc., San Jose, CA (US)

(72) Inventors: Vikram Kumaran, Cary, NC (US); Jean-Philippe Vasseur, Saint Martin d'uriage (FR); Vinay Kumar Kolar, San Jose, CA (US); Grégory Mermoud, Veyras VS (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/407,377

(22) Filed: May 9, 2019

(65) Prior Publication Data

US 2020/0358668 A1 Nov. 12, 2020

(51) Int. Cl.
*H04L 12/24* (2006.01)
*H04L 12/46* (2006.01)
*H04L 12/26* (2006.01)

(52) U.S. Cl.
CPC ...... *H04L 41/5009* (2013.01); *H04L 12/4633* (2013.01); *H04L 12/4641* (2013.01); *H04L 41/16* (2013.01); *H04L 43/0817* (2013.01)

(58) Field of Classification Search
CPC ............. H04L 41/5009; H04L 12/4633; H04L 12/4641; H04L 43/0817; H04L 41/16
See application file for complete search history.

(56) References Cited

U.S. PATENT DOCUMENTS

| 2005/0080893 A1* | 4/2005 | Castellanos .......... G06Q 10/063 709/224 |
| 2009/0106174 A1* | 4/2009 | Battisha ................ H04L 41/147 706/12 |
| 2017/0155590 A1 | 6/2017 | Dillon et al. |
| 2018/0213444 A1* | 7/2018 | Khawand .............. H04L 47/765 |
| 2019/0036779 A1 | 1/2019 | Bajaj |

(Continued)

OTHER PUBLICATIONS

Author: Tsung-Han et al. Title: "Deploying QoS-assured Service Function Chains with Stochastic Prediction Models on VNF Latency" Publisher: IEEE (Year: 2017).*

(Continued)

*Primary Examiner* — Ramy M Osman
*Assistant Examiner* — Kamal M Hossain
(74) *Attorney, Agent, or Firm* — Behmke Innovation Group LLC; Kenneth J. Heywood; Jonathon P. Western (57) ABSTRACT

In one embodiment, a supervisory service for a software-defined wide area network (SD-WAN) tracks a performance metric for a tunnel in the SD-WAN. The supervisory service computes a cumulative distribution function (CDF) for the tracked performance metric. The service assesses curvature of the CDF for the tracked performance metric relative to a service level agreement (SLA) threshold of an application for that performance metric. The service controls assignment of traffic for the application to the tunnel, based on the assessed curvature of the CDF for the tracked performance metric relative to the SLA threshold of the application for that performance metric.

20 Claims, 8 Drawing Sheets

(56) References Cited

U.S. PATENT DOCUMENTS

| | | |
|---|---|---|
| 2019/0036780 A1 | 1/2019 | Evans et al. |
| 2019/0036828 A1* | 1/2019 | Bajaj |
| 2019/0372891 A1* | 12/2019 | Smith .................... H04L 45/04 |
| 2020/0014619 A1* | 1/2020 | Shelar .................. H04L 45/302 |
| 2020/0153701 A1* | 5/2020 | Mohan ................. H04L 47/365 |
| 2020/0169472 A1* | 5/2020 | Karve ................... H04L 43/04 |

OTHER PUBLICATIONS

Author: Ville et al. Title: "Finding a "Kneedle" in a Haystack: Detecting Knee Points in System Behavior" Publisher: IEEE DOI 10.1109/ICDCSW.2011.20 (Year: 2011).*

Ghai, Rajesh, "Utilizing SD-WAN to Optimize Application-Driven Policy Management", Windstream Enterprise, Oct. 2017, pp. 1-13.

"SLA Profiles and SD-WAN Policies Overview", Contrail Service Orchestration User Guide, Juniper Networks, 2018, pp. 157-158.

"Sla-class", Cisco SD-WAN Command Reference, Sep. 30, 2019, pp. 399-400.

Satopaa et al., "Finding a 'Kneedle' in a Haystack: Detecting Knee Points in System Behavior", 2011 31st International Conference on Distributed Computing Systems Workshops, 2011, 6 pages.

* cited by examiner

INTELLIGENT TUNNEL ASSIGNMENT AND DYNAMIC SLA THRESHOLD CONFIGURATION TO INCREASE AVAILABILITY AND UTILIZATION OF SD-WAN TUNNELS

TECHNICAL FIELD

The present disclosure relates generally to computer networks, and, more particularly, to intelligent tunnel assignment and dynamic service level agreement (SLA) threshold configuration to increase availability and utilization of software-defined wide area network (SD-WAN) tunnels.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Every tunnel in an SD-WAN may have varying transport quality in terms of its performance metrics over time. Selection of a particular tunnel to convey traffic for an application is typically made by comparing the performance metrics of a tunnel to the SLA threshold(s) of the application, to ensure that the SLA of the application is met by the tunnel. While this approach can be relatively effective under many circumstances, hard SLA thresholds can also lead conditions that negatively affect the application traffic. For example, if the performance of a tunnel drops below the SLA threshold of the application, the application traffic may be moved to a second tunnel. In turn, if the performance of the second tunnel drops below the SLA threshold and the performance of the first tunnel raises again above the threshold, the traffic may be moved back to its original tunnel. Each movement of the application traffic can negatively affect the traffic and the performance of the application.

DESCRIPTION OF EXAMPLE EMBODIMENTS

Overview

According to one or more embodiments of the disclosure, a supervisory service for a software-defined wide area network (SD-WAN) tracks a performance metric for a tunnel in the SD-WAN. The supervisory service computes a cumulative distribution function (CDF) for the tracked performance metric. The service assesses curvature of the CDF for the tracked performance metric relative to a service level agreement (SLA) threshold of an application for that performance metric. The service controls assignment of traffic for the application to the tunnel, based on the assessed curvature of the CDF for the tracked performance metric relative to the SLA threshold of the application for that performance metric.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
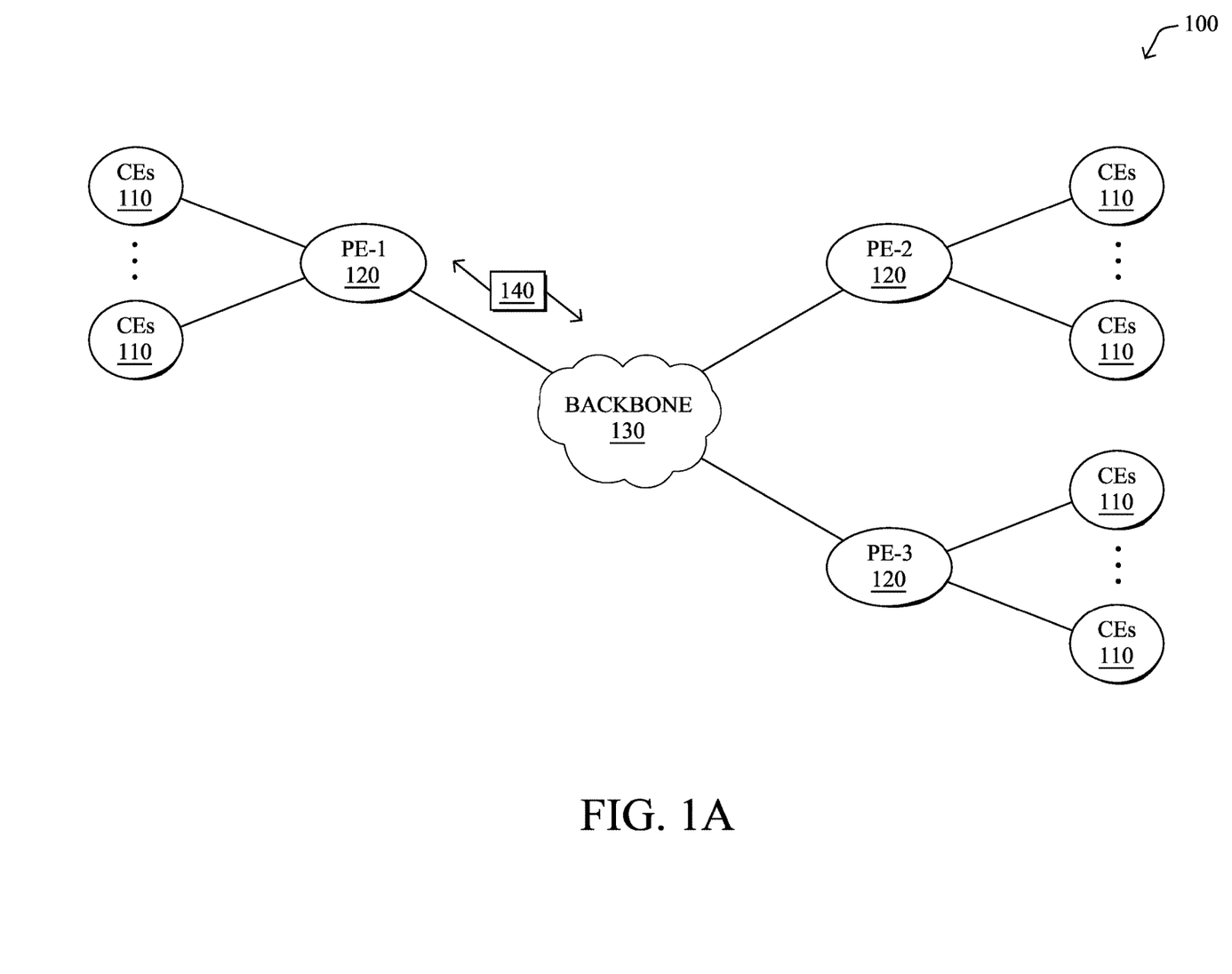
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
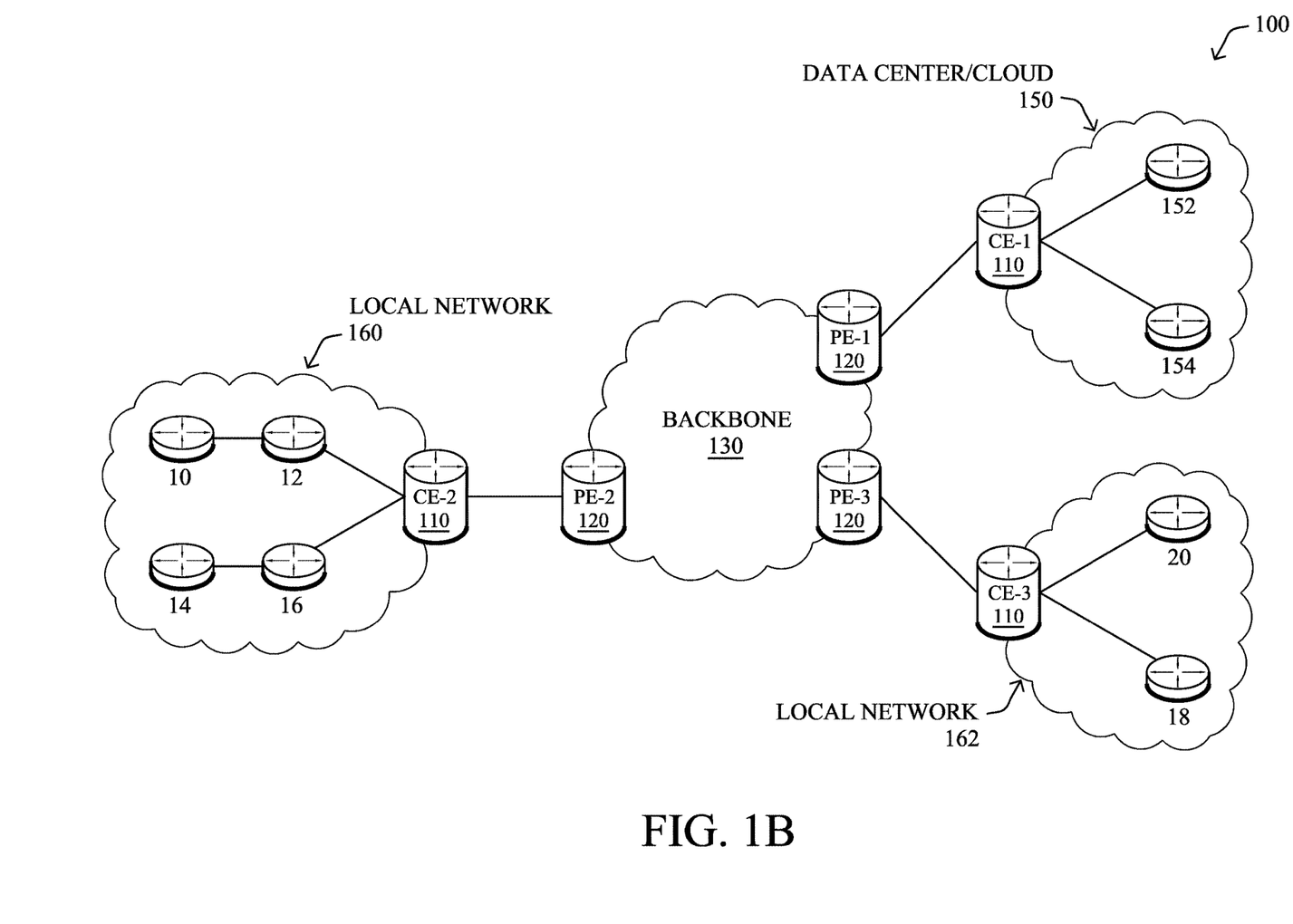

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WANs is centralized management by a supervisory service that can monitor and adjust the various connections, as needed.

Figure 2:
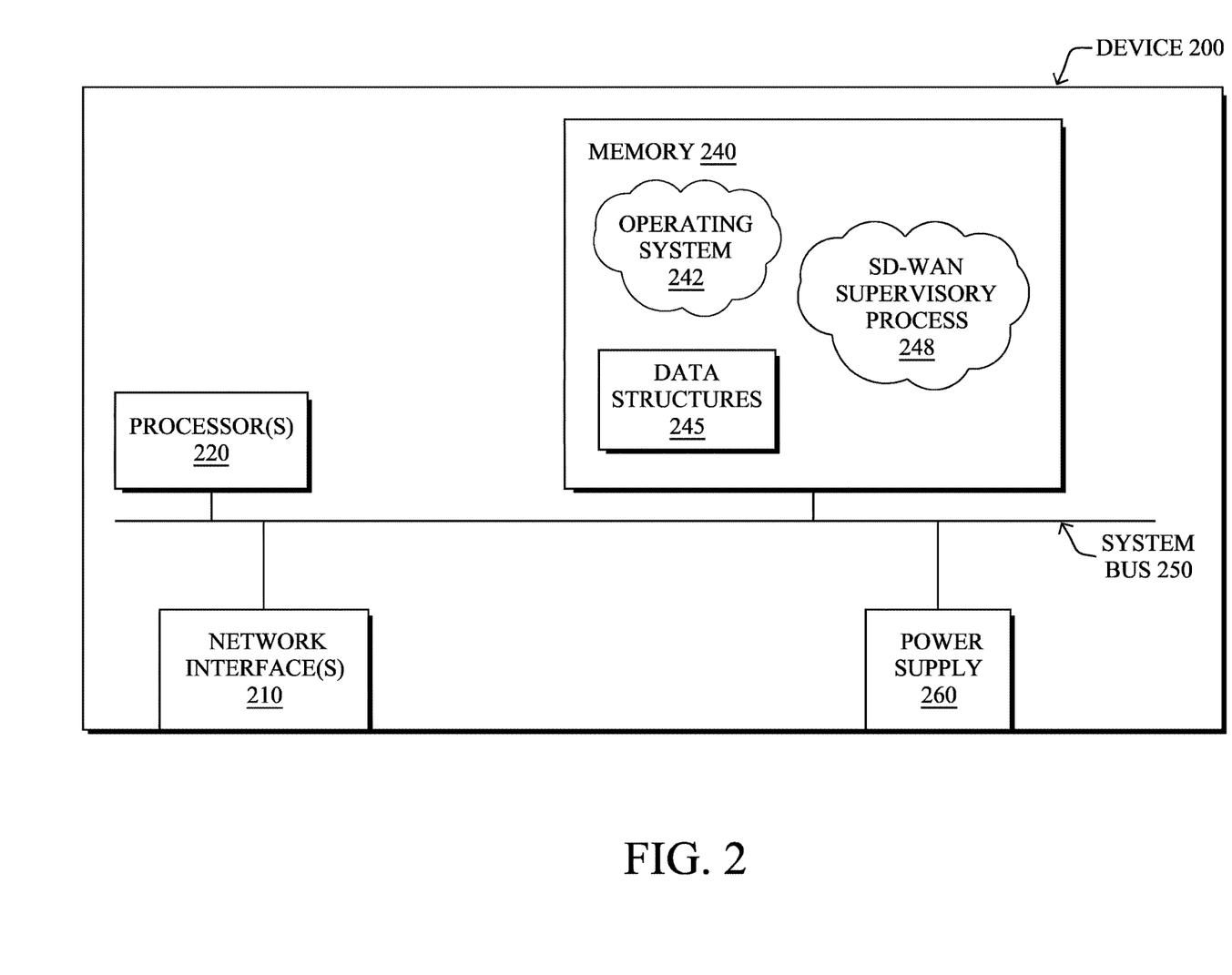
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an SD-WAN supervisory process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, SD-WAN supervisory process 248 includes computer executable instructions that, when executed by processor 220, assign application traffic in an SD-WAN to a tunnel in the SD-WAN, according to the service level agreement (SLAs) of the application. Generally, an SLA defines an acceptable level of performance of a tunnel, to convey the application traffic. For example, an SLA may specify that the tunnel should not exceed a defined threshold in terms of loss, jitter, delays, or other such performance metrics. Both initial assignment of the traffic to a tunnel, as well as the movement of the traffic to another tunnel, can be performed in an effort to meet the SLA(s) of the application associated with the traffic.

In various embodiments, as detailed further below, SD-WAN supervisory process 248 may also include computer executable instructions that, when executed by processor(s) 220, cause device 200 to predict tunnel failures and/or the performance of a tunnel over time, thereby allowing device 200 to proactively reroute traffic to avoid the failed element. To do so, in some embodiments, routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, SD-WAN supervisory process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a tunnel failure. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that SD-WAN supervisory process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, one of the promises of SD-WAN is the ability to optimally route traffic according to pre-determined traffic service level agreements (SLAs) for applications across various underlying tunnels in the SD-WAN. However, each tunnel usually has varying transport quality. An SD-WAN solution allows for seamless tunnel selection based on tunnel performance characteristics that can match application SLAs.

Selecting a tunnel on which the application traffic is routed is typically performed by comparing the SLA requirement of the application to what the tunnel is able to provide. Currently, such comparison is based on simple thresholds on network performance metrics such as loss, latency, or jitter. If the measured value of the metric at any given moment is worse than the specified threshold, the tunnel is marked as not meeting the SLA. A tunnel that fails the SLA template is not eligible to carry traffic from applications that require that quality.

Using such simple hard-thresholds often lead to suboptimal tunnel choices. For example, if the SLA for loss is set to 1%, and if the tunnel is currently experiencing loss of 1.1%, the hard SLA threshold will cause the tunnel to be rejected for the traffic and a search for an alternate tunnel will ensue. A tunnel violating the SLA requirement(s) of an application is no longer eligible to convey traffic of the application, leading to the traffic being rerouted onto a (less preferred) tunnel. Note also that it is not uncommon not to have any tunnel meeting all of the SLA requirements of the application, leading to routing the application traffic onto a last resort option.

SLA templates are also highly debatable. Indeed, many hard SLA thresholds have been specified over the past few years, sometimes without any strong consensus from the industry, not to mention that some of these parameters may be relaxed according to other networking parameters. For example, the application's tolerance to packet drops may depend on the type of transport using packet duplication, forward error correction (FEC), etc., whereas jitter tolerance will depend on the type of CODEC. Hence, adhering to hard SLA thresholds is not always justified. In contrast, it leads to severe side-effects such sub-optimal choices for tunnels or flapping of tunnels when performance metric value hovers narrowly around the SLA threshold of the application.

Intelligent Tunnel Assignment and Dynamic SLA Threshold Configuration to Increase Availability and Utilization of SD-WAN Tunnels The techniques herein introduce mechanisms for an SD-WAN whereby optimal application SLA thresholds can be selected based on the observed tunnel behavior and according to margin for adapting dynamically the SLA threshold. In some aspects, the techniques may use machine learning and/or statistical models to: (1) choose the affected tunnels where dynamic SLA tuning may reduce the tunnel flapping and (2) optimally adjust the SLA thresholds based on the tunnel characteristics. Such a scheme reduces the sub-optimal routing and tunnel flapping when the performance metrics for the tunnel are close to SLA agreement levels, and allows for avoiding situation where potentially no tunnels can satisfying the SLA, although they offer a "close enough" SLA.

Specifically, a supervisory service for a software-defined wide area network (SD-WAN) tracks a performance metric for a tunnel in the SD-WAN. The supervisory service computes a cumulative distribution function (CDF) for the tracked performance metric. The service assesses curvature of the CDF for the tracked performance metric relative to a service level agreement (SLA) threshold of an application for that performance metric. The service controls assignment of traffic for the application to the tunnel, based on the assessed curvature of the CDF for the tracked performance metric relative to the SLA threshold of the application for that performance metric.

Illustratively, the techniques described herein may be performed by hardware, software, and/or firmware, such as in accordance with the SD-WAN supervisory process 248, which may include computer executable instructions executed by the processor 220 (or independent processor of interfaces 210) to perform functions relating to the techniques described herein.

Figure 3:
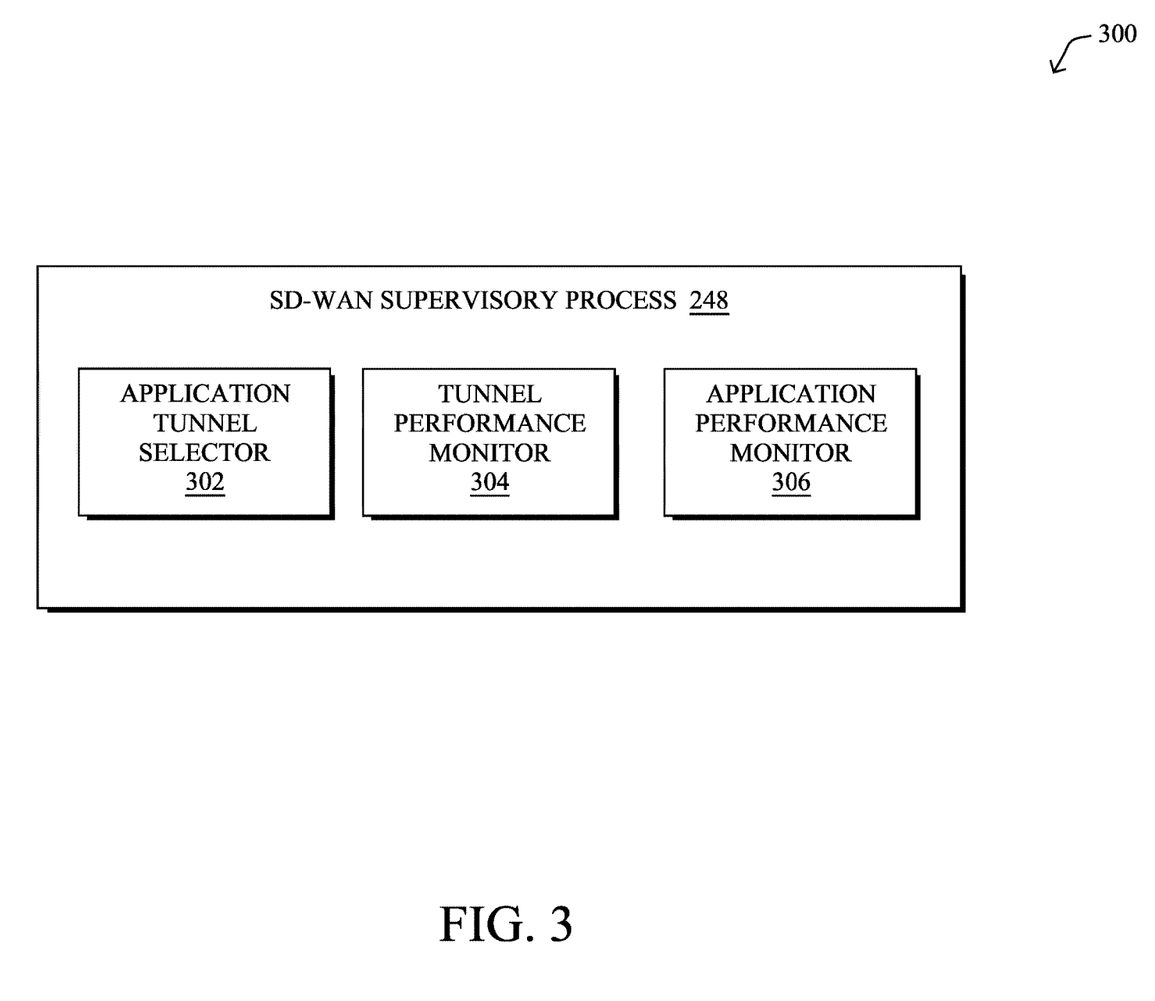
FIG. 3 illustrates an example architecture for dynamic service level agreement (SLA) adjustment in a software defined wide area network (SD-WAN)

Operationally, FIG. 3 illustrates an example architecture 300 for dynamic SLA adjustment in an SD-WAN, according to various embodiments. As shown, SD-WAN supervisory process 248 may include any or all of the following components: application tunnel selector 302, tunnel performance monitor 304, and/or application performance monitor 306. As would be appreciated, the functionalities of components 302-306 of SD-WAN supervisory process 248 may be combined or omitted, as desired. Further, components 302-306 may be executed by a single device or, alternatively, may be implemented in a distributed manner across any number of devices. For example, SD-WAN supervisory process 248 may be executed on a networking device, such as a router, or may be implemented in whole or in part as a cloud-based service in communication with the networking device(s) of the SD-WAN.

In SD-WAN networks, applications are configured to only use tunnels that meet the specific SLAs of the applications. SLAs are expressed as simple rules based on thresholds. For example, an SLA for voice applications could be of the form:

{
   loss percentage < 1% AND
   latency < 500ms AND
   jitter < 100ms
}

According to various embodiments, application tunnel selector 302 may be operable to control the tunnel assignments for an application. Traditionally, this was a simple process that entails comparing the SLA requirements of the application and the performance metric(s) of the tunnels in the SD-WAN to choose the best tunnel for the application (e.g., the application that is most likely to meet the SLA requirements of the application). In contrast, the techniques herein are not limited as such and introduce a new analysis approach to assign applications to tunnels, as well as a mechanism to dynamically adjust the SLA threshold(s) of the application, as needed.

Recall that tunnel SLAs are threshold-based rules for performance metrics such as loss, latency, and jitter. Each application is associated with a given SLA rule and the application's traffic will be allowed onto a tunnel only if the performance of the tunnel satisfies this rule. Thus, the fraction of time the tunnel satisfies the SLA, or violates the SLA, determines the amount of time the tunnel is available to be used to convey traffic of the application.

In various embodiments, application tunnel selector 302 may be configured to quantify the sensitivity of a tunnel to changes in the SLA threshold of an application. Notably, slight changes to the SLA threshold of the application can, in many cases, have a great impact on the amount of time the tunnel would be available to support the traffic of the application.

Figure 4A:
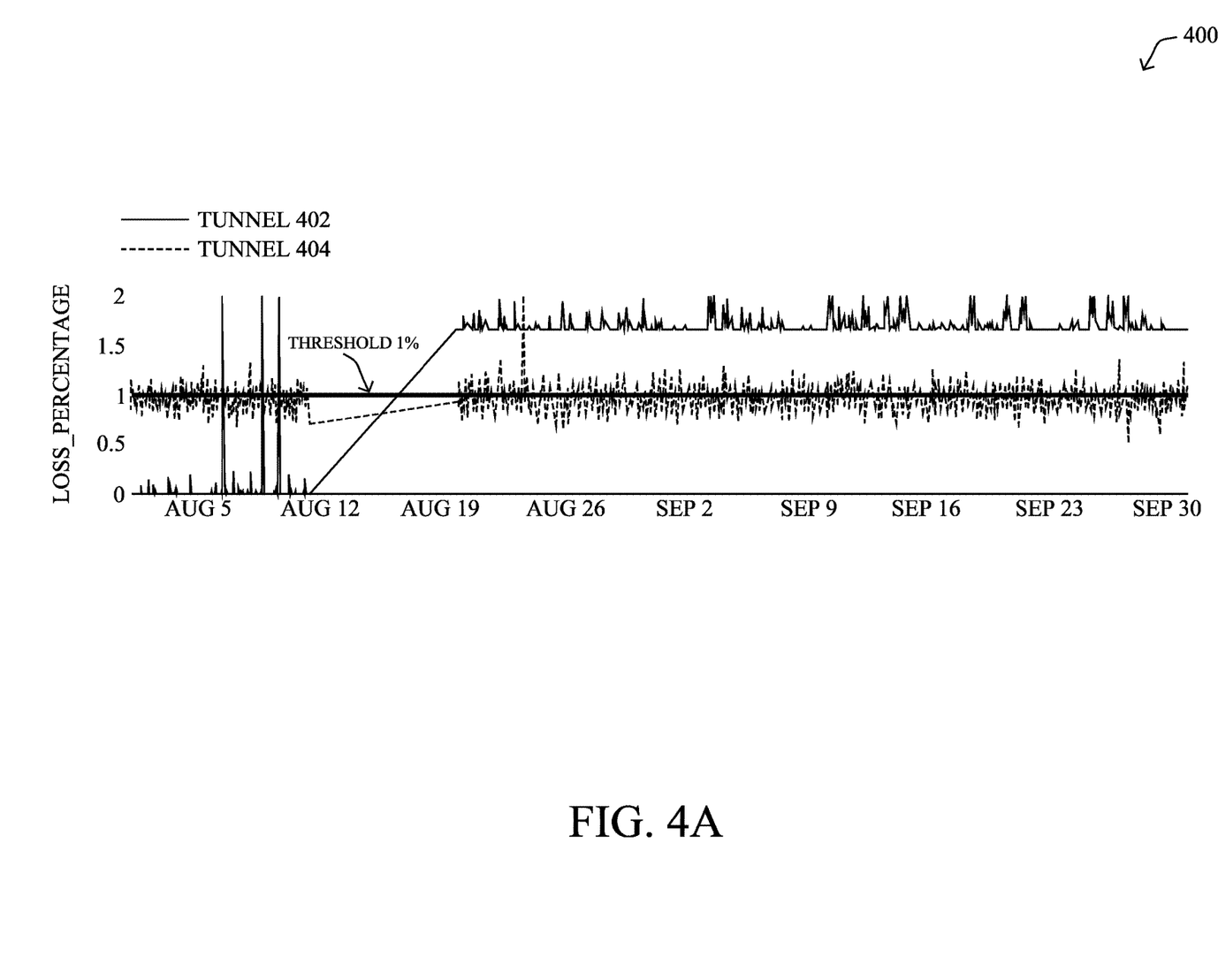
FIGS. 4A-4B illustrate example plots of tunnel performance metrics versus SLA thresholds.

To better illustrate the concept of tunnel sensitivity, FIGS. 4A-4B illustrate example plots of tunnel performance metrics versus SLA thresholds. As shown in plot 400 in FIG. 4A, the loss percentage for two separate tunnels is plotted over a two-month long period. Also as shown, assume that a particular application in the SD-WAN has an SLA threshold of 1% loss. From plot 400, it can be seen that tunnel 402 is clearly available for use by the application until approximately August $12^{th}$, since its loss percentage is almost entirely below the SLA threshold of the application. However, after this date, the loss percentage of the tunnel increases and, from August $19^{th}$ onward, the tunnel is no longer eligible to carry the application's traffic.

Conversely, from plot 400, it can also be seen that tunnel 404 also repeatedly violates the SLA threshold of the application, when the threshold is set to 1% of loss. Unlike tunnel 402, this situation is even more problematic as the performance of the tunnel repeatedly crosses the SLA threshold of the application and returns to being eligible to carry the application's traffic.

Figure 4B:
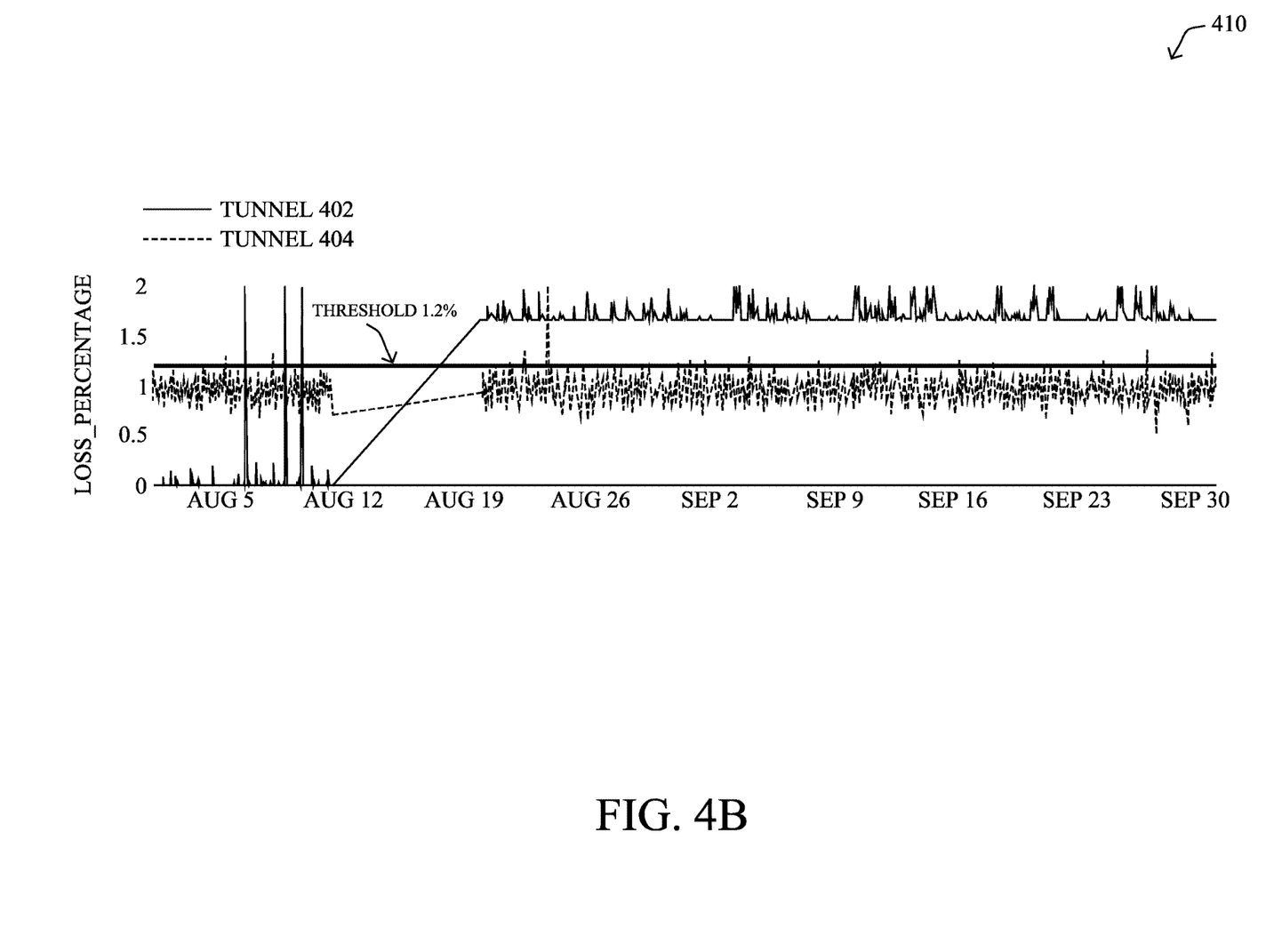

A key observation is that, in some cases, a minor adjustment to the SLA threshold of an application can have a significant impact on the eligibility of a tunnel to carry the traffic of the application. For example, as shown in plot 410 in FIG. 4B, assume that the SLA threshold of the application is increased from 1% to 1.2%, which arguably should not affect the performance of the application much, tunnel 404 now becomes available for use by the application's traffic in more than 95% of the time period shown. Here, a slight change in the SLA threshold of the application greatly increases the available of tunnels whose performance metrics hover around the SLA threshold. Tunnels that exhibit this characteristic can be flagged in the SD-WAN as SLA threshold "sensitive" and those that do not, such as tunnel 402, can be flagged as SLA threshold "insensitive."

Referring again to FIG. 3, application tunnel selector 302 may be configured to identify SLA threshold sensitive tunnels and dynamically adjust SLA thresholds The system proposes novel technique to: (1) identify sensitive tunnels, and (b) dynamically adjust thresholds for sensitive tunnels. To identify SLA threshold sensitive tunnels, application tunnel selector 302 may assess the performance metrics of the tunnel over time.

In one embodiment, application tunnel selector 302 may assess a cumulative distribution function (CDF) of the performance metric, to determine whether the corresponding tunnel is SLA threshold sensitive. Typically, a CDF shows the value of the metric (e.g., loss percentage, etc.) on the x-axis. The y-axis of the CDF shows the percentage (or fraction) of the samples that are lesser than a given metric value.

The shape of the CDF provides information about the sensitivity of the tunnel adjustments of the SLA threshold of the application. More specifically, application tunnel selector 302 may assess the curvature of the CDF of the tunnel's performance metric relative to the application's SLA threshold, to determine whether the tunnel is SLA threshold sensitive or insensitive.

Figure 5:
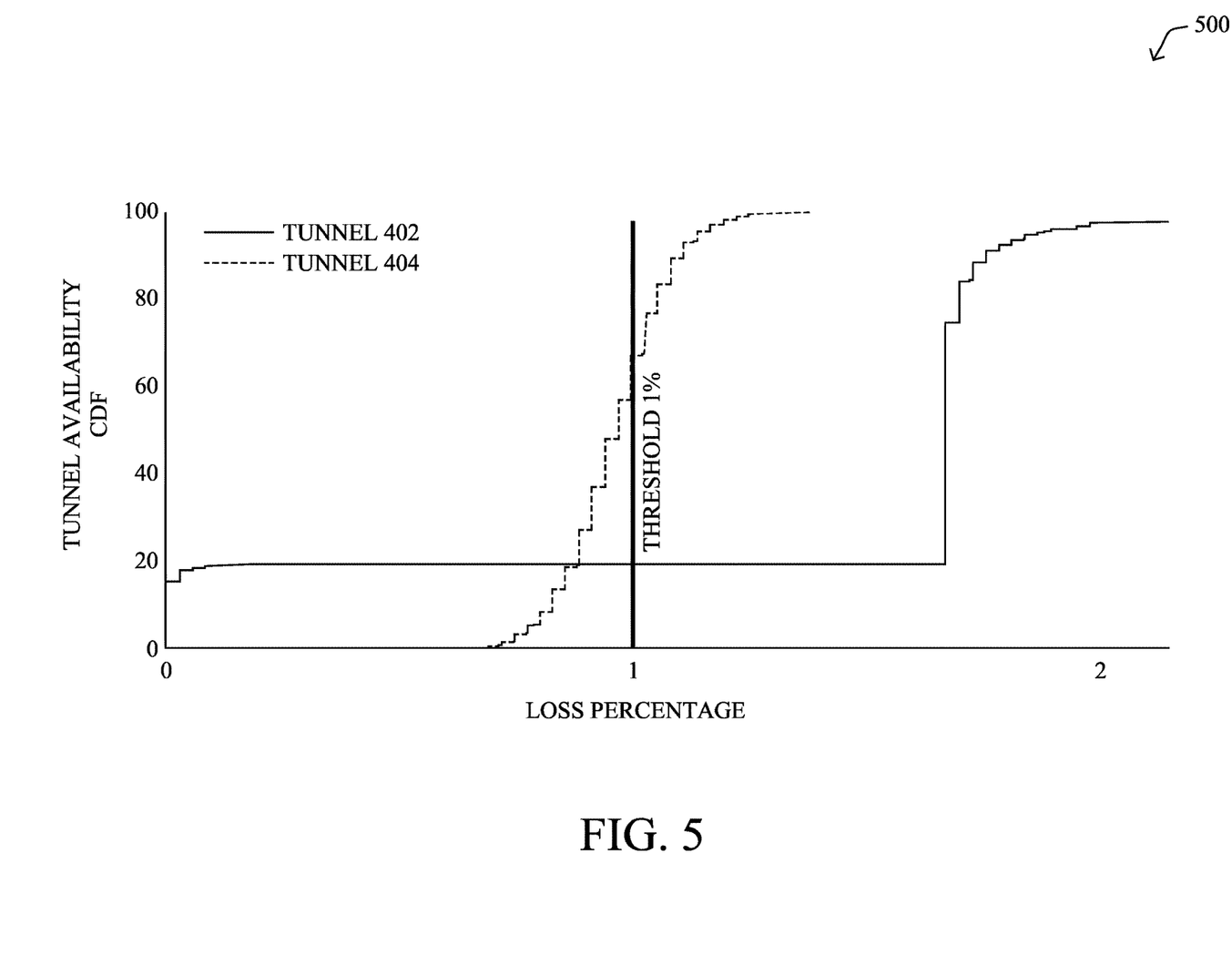
FIG. 5 illustrates an example plot of cumulative distribution function (CDF) of tunnel performance metrics for different tunnels.

To illustrate the CDF analysis by application tunnel selector 302, FIG. 5 illustrates an example plot 500 of tunnel performance metrics for tunnels 402 and 402 relative to the SLA threshold of an application. From plot 500, it can be seen that if the CDF of tunnel 402 raises nearly to 100% much after the SLA threshold, the tunnel is insensitive to minor adjustments to the threshold. Conversely, as in the case of tunnel 404, if its CDF jumps to approximately 100% right around the SLA threshold, minor changes to the threshold can greatly affect the availability of the tunnel to convey traffic of the application.

Referring again to FIG. 3, application tunnel selector 302 may assess the curvature of the CDF of a tunnel's performance metric relative to the SLA threshold of the application, to flag the tunnel as being SLA threshold sensitive, available, or unavailable. In some embodiments, application tunnel selector 302 may do so by taking the following approach:

1. For each tunnel, consider the CDF of the performance metric. This information can be provided in real-time, in some cases, by tunnel performance monitor 304, as detailed below.
2. For each application for which a tunnel assignment is needed:
    A. For all tunnels, and all performance metrics (e.g., loss, latency, jitter, etc.)
        i. Assess the curvature of the CDF within a defined distance of the threshold. For example, application tunnel selector 302 may compute the "knee" of the CDF (knee_low, knee_high). These are the points where the slope changes drastically increase, which can be computed in any number of ways (e.g., based on the first and/or second derivative of the CDF).
        ii. If the knee of the CDF is near the threshold, then mark the tunnel as "sensitive" for the given application. For example, if the current threshold is 1%, application tunnel selector 302 may check whether the knee of the CDF is between 1.0% to 1.1% (or any other strict upper limit that admin may provide).
        iii. If the knee of the CDF is far away from the threshold, application tunnel selector 302 may mark the tunnel as "unavailable" to the application.
        iv. If the knee of the CDF is far below the threshold, application tunnel selector 302 may mark the tunnel as "available" to the application.

In various embodiments, application tunnel selector 302 may control its assignment of traffic of the application to a particular tunnel, based on the above assessments. For example, if the distance between a point of curvature of the CDF (e.g., the knee of the CDF) is beyond a certain distance above the SLA threshold of the application, application tunnel selector 302 may flag the tunnel as available and assign the traffic of the application to the tunnel. Conversely, if the point of curvature is well below the SLA threshold, application tunnel selector 302 may flag the tunnel as unavailable and prohibit the traffic of the application from being assigned to the tunnel.

In cases in which application tunnel selector 302 flags a tunnel as SLA threshold sensitive (e.g., by determining that the SLA threshold is near a point of slope increase on the CDF of the tunnel), it may adjust the SLA threshold of the application, in an effort to make the tunnel non-SLA threshold sensitive, and may assign the traffic for the application to the tunnel. Such an SLA threshold adjustment may be dynamic in nature and may be controlled by a number of factors including:

Whether a hard limit has been set for the SLA threshold—If an administrator has enabled the dynamic SLA threshold selection for an application by application tunnel selector 302, they may also specify a maximum or minimum bound for the dynamic selection. For example, assume that network best practices suggest that video traffic should never use a tunnel with loss greater than 2%. In such a case, this can be set as a hard limit for the SLA threshold adjustment, to ensure that application tunnel selector 302 never adjusts the SLA threshold beyond this limit.

The performance of the tunnel—As the performance metrics of the tunnel can and likely will change over time, it is also important for application tunnel selector 302 to update the CDF of the tunnel and periodically reassess its tunnel assignments. This can be achieved, as detailed below, in conjunction with the operation of tunnel performance monitor 304.

The performance of the application—Another important consideration for application tunnel selector 302 is the impact of an SLA threshold change on the performance of the application itself. For example, if the mean opinion score (MOS) for a video application takes a significant hit as a result of a slight change in the loss SLA threshold of the application, application tunnel selector 302 may re-lower the SLA threshold and potentially flag the tunnel as unavailable to the application, as well.

In various embodiments, tunnel performance monitor 304 may be configured to monitor the performance of a tunnel over time and report the measured performance metric(s) to application tunnel selector 302. Notably, the performance of a tunnel can change over time and is very likely to do so. During execution, tunnel performance monitor 304 may continuously monitor the performance of the tunnel over a period of time (e.g., the last few minutes, etc.) and report aggregated features or statistics to application tunnel selector 302, allowing application tunnel selector 302 to assign traffic to tunnels and adjust SLA thresholds, as needed. For example, in various embodiments, tunnel performance monitor 304 may compute a CDF of the monitored performance metric and report the computed CDF to application tunnel selector 302 for assessment. Note that the functions of tunnel performance monitor 304 is different from traditional tunnel performance monitors, which simply report tunnel SLAs.

In one embodiment, tunnel performance monitor 304 may use BFD probes or another similar mechanism to capture and analyze the past n-number of minutes of the performance metric for the tunnel. In turn, tunnel performance monitor 304 may compute a tunnel-specific CDF for each performance metric (e.g., loss, latency, jitter, etc.) and provide the CDF to application tunnel selector 302.

In a further embodiment, tunnel performance monitor 304 may employ machine learning to predict values of the performance metric of the tunnel for assessment by application tunnel selector 302. For example, tunnel performance monitor 304 may employ a generative Gaussian model to predict the values of the tunnel's performance metric for the next m-number of minutes and use these values to compute the CDF for assessment by application tunnel selector 302.

SD-WAN supervisory process 248 may also include application performance monitor 306 configured to monitor the performance of the application whose traffic is communicated via one of the tunnels selected by application tunnel selector 302, in various embodiments. In general, a key functionality of application performance monitor 306 is to ensure that any SLA threshold adjustments made by application tunnel selector 302 do not have a negative impact on the application itself. If application performance monitor 306 observes degraded performance of the application, it may trigger application tunnel selector 302 to either reassign the application traffic to another tunnel or readjust the SLA threshold of the application, accordingly.

Application performance monitor 306 may monitor any number of performance metrics. For example, in some cases, application performance monitor 306 may monitor the same performance metrics as that of tunnel performance monitor 304 (e.g., loss, latency, jitter, etc.), but specific to the application's traffic itself instead of tunnel-wide. In further embodiments, application performance monitor 306 may monitor different, application-specific performance metrics, which are often related to the tunnel performance metrics monitored by tunnel performance monitor 304.

For example, mean opinion score (MOS) is often used to quantify the quality of a voice or video call, which can be negatively affected by high loss, latency, jitter, etc. on the tunnel. Thus, application performance monitor 306 may monitor the effects of application tunnel selector 302 adjusting the SLA threshold(s) of the application in terms of loss, latency, etc. on the MOS of the application. In turn, if the MOS monitored by application performance monitor 306 drops below an acceptable threshold, application tunnel selector 302 may readjust the SLA threshold of the application and/or reroute the traffic of the application onto a different tunnel. When application tunnel selector 302 switches application traffic from one tunnel to another, it may also blacklist the original tunnel for a certain period of time from conveying traffic of the application (e.g., for the next few minutes, etc.). Other application metrics may be chosen for monitoring by application performance monitor 306, as well, such as the detection of traffic drops, higher rate of packet retransmission (with TCP), and the like.

Application tunnel selector 302, tunnel performance monitor 304, and application performance monitor 306 may operate in conjunction with one another to provide closed-loop control, in various embodiments. Such control may be implemented, for example, by application tunnel selector 302 increasing the SLA threshold of the application by a small amount when routed on a sensitive tunnel and monitors 304-306 monitoring the effects of this change. As the SLA threshold is varied, the percentage of time the tunnel available to the application also changes, as well as the CDF of the associated metric. If the SLA threshold increase results in a loss of performance, either at the tunnel or application level, application tunnel selector 302 may back off the latest adjustment. In addition, a subject matter expert can also specify an upper and/or lower bound to the performance metric associated with the SLA threshold, defining how much application tunnel selector 302 can adjust the threshold dynamically.

Figure 6:
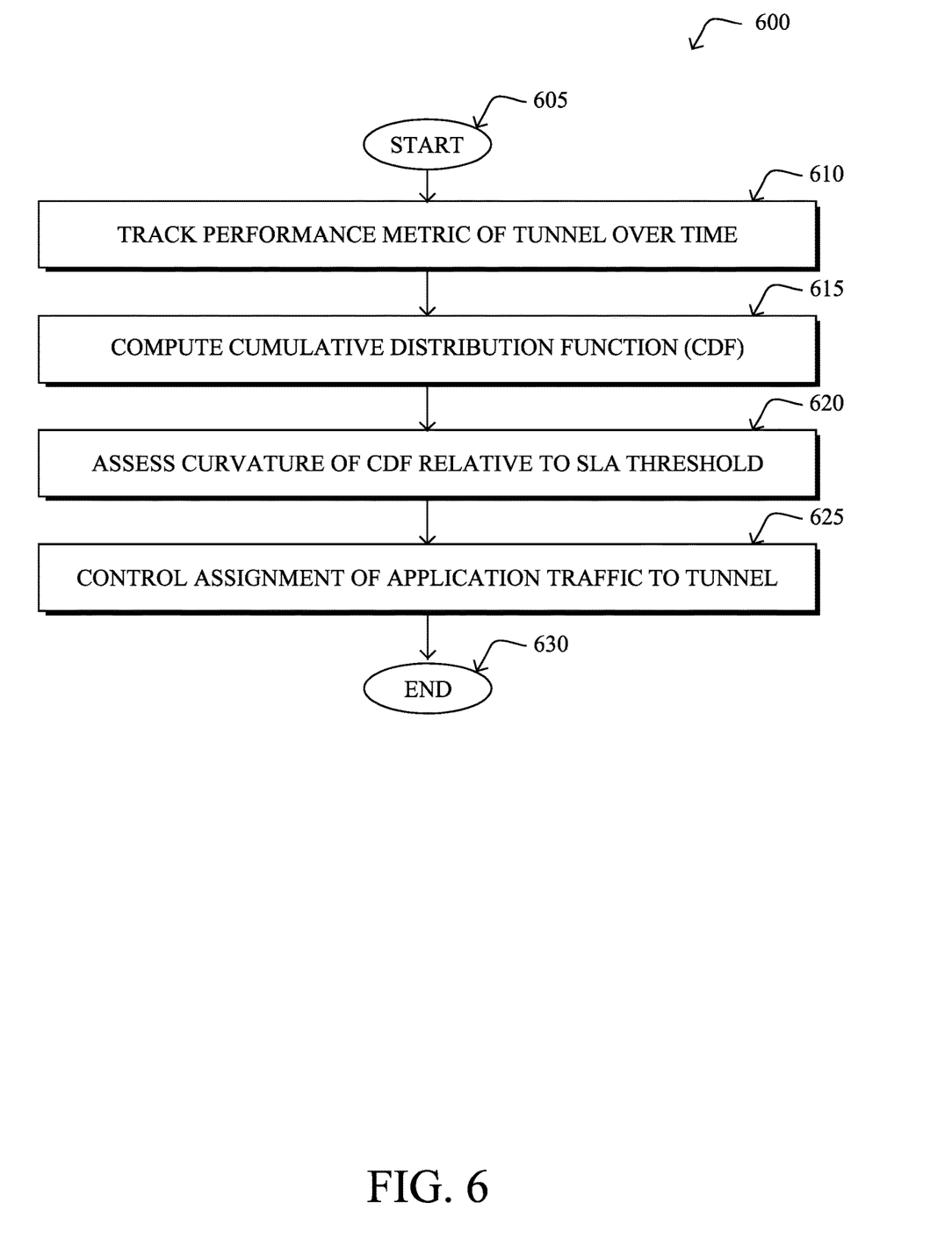
FIG. 6 illustrates an example simplified procedure for controlling assignment of application traffic to a tunnel.

FIG. 6 illustrates an example simplified procedure for controlling assignment of application traffic to a tunnel, in accordance with one or more embodiments described herein. For example, a non-generic, specifically configured device (e.g., device 200) may perform procedure 600 by executing stored instructions (e.g., process 248), to provide a supervisory service to an SD-WAN. The procedure 600 my start at step 605 and continue on to step 610 where, as described in greater detail above, the supervisory service may track a performance metric for a tunnel in the SD-WAN. Such a metric may be indicative of loss on the tunnel, latency on the tunnel, jitter on the tunnel, or any other performance metric that can be measured for the tunnel.

At step 615, as detailed above, the supervisory service may compute a cumulative distribution function (CDF) for the tracked performance metric. For example, the service may use the measured values of the performance metric over the past n-number of minutes, to compute a CDF for the metric. In some embodiments, the service may also use a machine learning model to predict values of the performance metric for the tunnel and base the computed CDF, at least in part, on the predicted values.

At step 620, the supervisory service may assess curvature of the CDF for the tracked performance metric relative to an SLA threshold of an application for that performance metric, as described in greater detail above. For example, the service may identify a point of slope increase on the CDF and compare its distance to that of the SLA threshold of the application. Such a point of slope increase may be identified through analysis of the first and/or second derivative of the CDF, in some cases. For example, let f be a continuous function and let $K_f(x)$ define the curvature off at any point as follows:

$$K_f(x) = \frac{f''(x)}{(1+f'(x)^2)^{1.5}}$$

Using the above equation, or another suitable computation, the supervisory service can quickly and efficiently identify a 'knee' of the CDF and compare its location to that of the SLA threshold of the application.

At step 625, as detailed above, the supervisory service may control assignment of traffic for the application to the tunnel, based on the assessed curvature of the CDF for the tracked performance metric relative to the SLA threshold of the application for that performance metric. For example, if the point of slope increase of the CDF is below that of the SLA threshold by a predefined distance, the service may flag the tunnel as acceptable for the application and route its traffic onto the tunnel. Conversely, if the point of slope increase of the CDF is above that of the SLA threshold by a predefined distance, the service may determine that the tunnel is unsuitable for use by the application and prevent the application's traffic from using the tunnel. In cases in which the SLA threshold is near the point of slope increase on the CDF (e.g., within a defined distance of one another), the service may flag the tunnel as SLA threshold sensitive. In various embodiments, the service may assign the application traffic to the tunnel and dynamically adjust the SLA threshold of the application, monitoring the performance metric of the tunnel and/or an application performance metric, to ensure that the SLA threshold adjustment, even when very minor, does not negatively affect the application. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the intelligent assignment of application traffic to tunnels. In addition, the techniques herein introduce a dynamic SLA thresholding mechanism where the SLA threshold of the application is dynamically adjusted in the case of SLA sensitive tunnels, which can greatly increase the amount of time the tunnels are available for use by the traffic of the application. Such an increase can prevent most, if not all, situations in which the traffic is rerouted onto a different tunnel, which can be quite disruptive to the application.

While there have been shown and described illustrative embodiments that provide for assigning application traffic to tunnels in an SD-WAN, it is to be understood that various other adaptations and modifications may be made within the spirit and scope of the embodiments herein. For example, while certain embodiments are described herein with respect to using certain models for purposes of predicting failures, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   tracking, by a supervisory service for a software-defined wide area network (SD-WAN), a performance metric for a tunnel in the SD-WAN;
   computing, by the supervisory service, a cumulative distribution function (CDF) for the tracked performance metric;
   assessing, by the supervisory service, curvature of the CDF for the tracked performance metric relative to a service level agreement (SLA) threshold of an application for that performance metric; and
   controlling, by the supervisory service, assignment of traffic for the application to the tunnel, based on the assessed curvature of the CDF for the tracked performance metric relative to the SLA threshold of the application for that performance metric,
   wherein the assessing of the curvature of the CDF for the tracked performance metric relative to the SLA threshold of the application for that performance metric comprises:
   computing, by the supervisory service, a point of slope increase on the CDF; and
   determining, by the supervisory service, a distance between the computed point of slope increase on the CDF and the SLA threshold of the application for that performance metric, wherein the computed point of slope increase on the CDF is either above or below the SLA threshold.

2. The method as in claim 1, wherein controlling assignment of the traffic for the application to the tunnel, based on the assessed curvature of the CDF for the tracked performance metric relative to the SLA threshold of the application for that performance metric, comprises:
   determining that the SLA threshold is below the point of slope increase on the CDF beyond a predefined distance; and
   assigning the traffic for the application to the tunnel, based on the determination.

3. The method as in claim 1, wherein controlling assignment of the traffic for the application to the tunnel, based on the assessed curvature of the CDF for the tracked performance metric relative to the SLA threshold of the application for that performance metric, comprises:
   determining that the SLA threshold is above the point of slope increase on the CDF beyond a predefined distance; and
   prohibiting the traffic for the application from being assigned to the tunnel, based on the determination.

4. The method as in claim 1, wherein controlling assignment of the traffic for the application to the tunnel, based on the assessed curvature of the CDF for the tracked performance metric relative to the SLA threshold of the application for that performance metric, comprises:
   determining that the SLA threshold is near the point of slope increase on the CDF when the distance between the point of slope increase on the CDF and the SLA threshold is less than a predefined distance; and
   flagging the tunnel as SLA threshold sensitive, based on the determination.

5. The method as in claim 4, further comprising:
adjusting the SLA threshold of the application, in an effort to make the tunnel non-SLA threshold sensitive; and
assigning the traffic for the application to the tunnel, with the adjusted SLA threshold.

6. The method as in claim 5, further comprising:
monitoring a performance metric for the application, after adjusting the SLA threshold of the application; and
dynamically re-adjusting the SLA threshold of the application, when the performance metric for the application is unacceptable.

7. The method as in claim 5, further comprising:
monitoring a performance metric for the application, after adjusting the SLA threshold of the application; and
dynamically re-adjusting the SLA threshold of the application, to optimize the performance metric for the application.

8. The method as in claim 1, wherein computing the CDF for the tracked performance metric comprises:
using a machine learning model to predict values of the performance metric for the tunnel; and
computing the CDF, at least in part, using the predicted values of the performance metric.

9. The method as in claim 1, further comprising:
updating the CDF using additional values of the tracked performance metric for the tunnel.

10. The method as in claim 1, wherein the tracked performance metric is indicative of: loss on the tunnel, latency on the tunnel, or jitter on the tunnel.

11. An apparatus, comprising:
one or more network interfaces to communicate with a software defined wide area network (SD-WAN);
a processor coupled to the network interfaces and configured to execute one or more processes; and
a memory configured to store a process executable by the processor, the process when executed configured to:
track a performance metric for a tunnel in the SD-WAN;
compute a cumulative distribution function (CDF) for the tracked performance metric;
assess curvature of the CDF for the tracked performance metric relative to a service level agreement (SLA) threshold of an application for that performance metric; and
control assignment of traffic for the application to the tunnel, based on the assessed curvature of the CDF for the tracked performance metric relative to the SLA threshold of the application for that performance metric,
wherein the apparatus assesses the curvature of the CDF for the tracked performance metric relative to the SLA threshold of the application for that performance metric by:
computing a point of slope increase on the CDF; and
determining a distance between the computed point of slope increase on the CDF and the SLA threshold of the application for that performance metric, wherein the computed point of slope increase on the CDF is either above or below the SLA threshold.

12. The apparatus as in claim 11, wherein the apparatus controls assignment of the traffic for the application to the tunnel, based on the assessed curvature of the CDF for the tracked performance metric relative to the SLA threshold of the application for that performance metric, by:
determining that the SLA threshold is below the point of slope increase on the CDF beyond a predefined distance; and
assigning the traffic for the application to the tunnel, based on the determination.

13. The apparatus as in claim 11, wherein the apparatus controls assignment of the traffic for the application to the tunnel, based on the assessed curvature of the CDF for the tracked performance metric relative to the SLA threshold of the application for that performance metric, by:
determining that the SLA threshold is above the point of slope increase on the CDF beyond a predefined distance; and
prohibiting the traffic for the application from being assigned to the tunnel, based on the determination.

14. The apparatus as in claim 11, wherein the apparatus controls assignment of the traffic for the application to the tunnel, based on the assessed curvature of the CDF for the tracked performance metric relative to the SLA threshold of the application for that performance metric, by:
determining that the SLA threshold is near the point of slope increase on the CDF when the distance between the point of slope increase on the CDF and the SLA threshold is less than a predefined distance; and
flagging the tunnel as SLA threshold sensitive, based on the determination.

15. The apparatus as in claim 14, wherein the process when executed is further configured to:
adjust the SLA threshold of the application, in an effort to make the tunnel non-SLA threshold sensitive; and
assign the traffic for the application to the tunnel, with the adjusted SLA threshold.

16. The apparatus as in claim 15, wherein the process when executed is further configured to:
monitor a performance metric for the application, after adjusting the SLA threshold of the application; and
dynamically re-adjust the SLA threshold of the application, when the performance metric for the application is unacceptable.

17. The apparatus as in claim 16, wherein the process when executed is further configured to:
monitor a performance metric for the application, after adjusting the SLA threshold of the application; and
dynamically re-adjust the SLA threshold of the application, to optimize the performance metric for the application.

18. The apparatus as in claim 11, wherein the apparatus computes the CDF for the tracked performance metric by:
using a machine learning model to predict values of the performance metric for the tunnel; and
computing the CDF, at least in part, using the predicted values of the performance metric.

19. The apparatus as in claim 11, wherein the process when executed is further configured to:
update the CDF using additional values of the tracked performance metric for the tunnel.

20. A tangible, non-transitory, computer-readable medium storing program instructions that cause a supervisory service for a software defined wide area network (SD-WAN) to execute a process comprising:
tracking, by the supervisory service for the SD-WAN, a performance metric for a tunnel in the SD-WAN;
computing, by the supervisory service, a cumulative distribution function (CDF) for the tracked performance metric;
assessing, by the supervisory service, curvature of the CDF for the tracked performance metric relative to a service level agreement (SLA) threshold of an application for that performance metric; and controlling, by the supervisory service, assignment of traffic for the application to the tunnel, based on the assessed curvature of the CDF for the tracked performance metric relative to the SLA threshold of the application for that performance metric wherein the assessing of the curvature of the CDF for the tracked performance metric relative to the SLA threshold of the application for that performance metric comprises:

computing, by the supervisory service, a point of slope increase on the CDF; and determining, by the supervisory service, a distance between the computed point of slope increase on the CDF and the SLA threshold of the application for that performance metric, wherein the computed point of slope increase on the CDF is either above or below the SLA threshold.

* * * * *

UNITED STATES PATENT AND TRADEMARK OFFICE
CERTIFICATE OF CORRECTION

| | | |
|---|---|---|
| PATENT NO. | : 10,951,490 B2 | Page 1 of 1 |
| APPLICATION NO. | : 16/407377 | |
| DATED | : March 16, 2021 | |
| INVENTOR(S) | : Vikram Kumaran et al. | |

It is certified that error appears in the above-identified patent and that said Letters Patent is hereby corrected as shown below:

In the Specification

Column 12, Line 20, please amend as shown:
is available to the application also changes, as well as the CDF Column 12, Line 59, please amend as shown:
CDF, in some cases. For example, let $f$ be a continuous Column 12, Line 60, please amend as shown:
function and let $K_f(x)$ define the curvature of $f$ at any point as In the Claims Column 17, Line 5, Claim 20, please amend as shown:
application for that performance metric, Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*